United States Patent Office 3,471,703
Patented Oct. 7, 1969

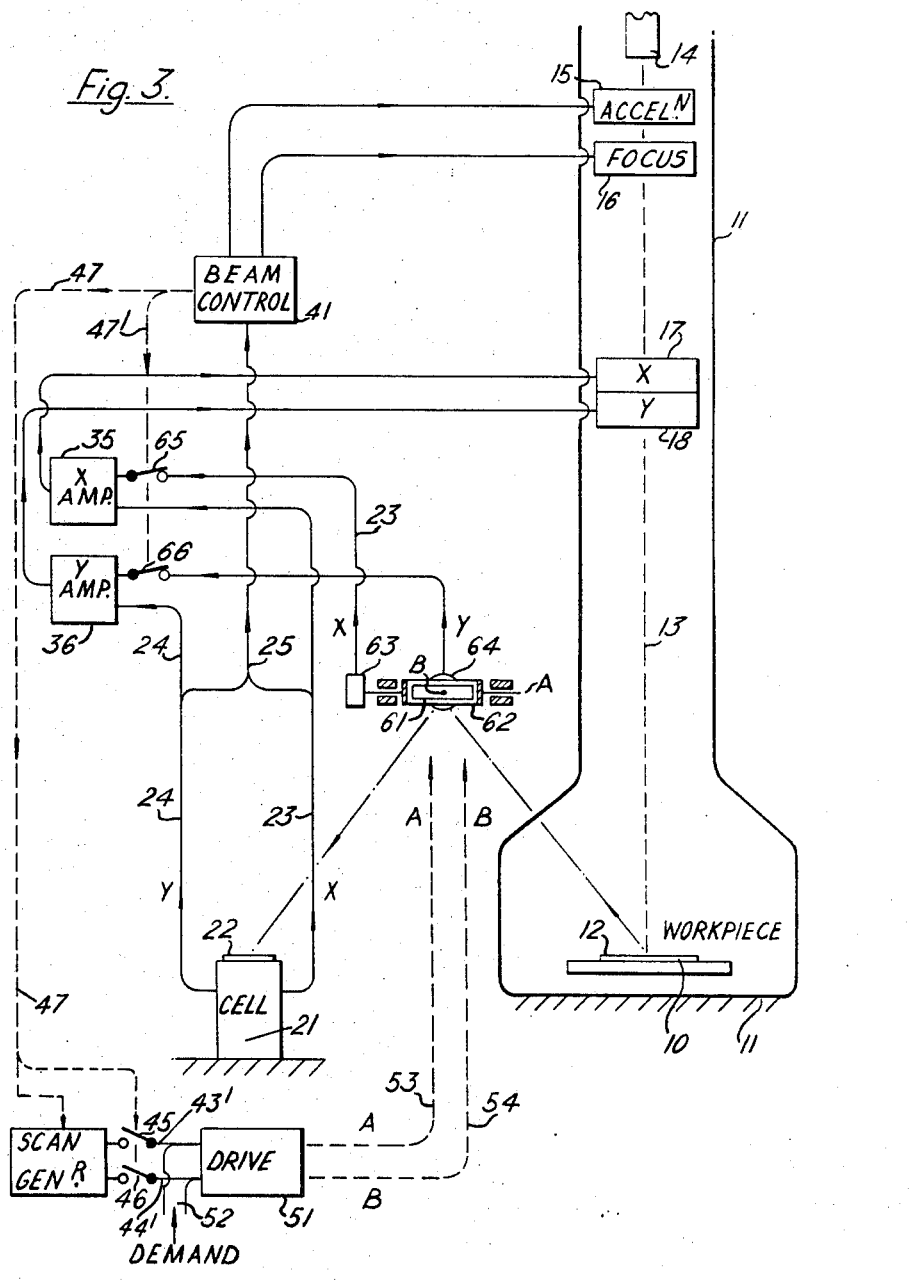

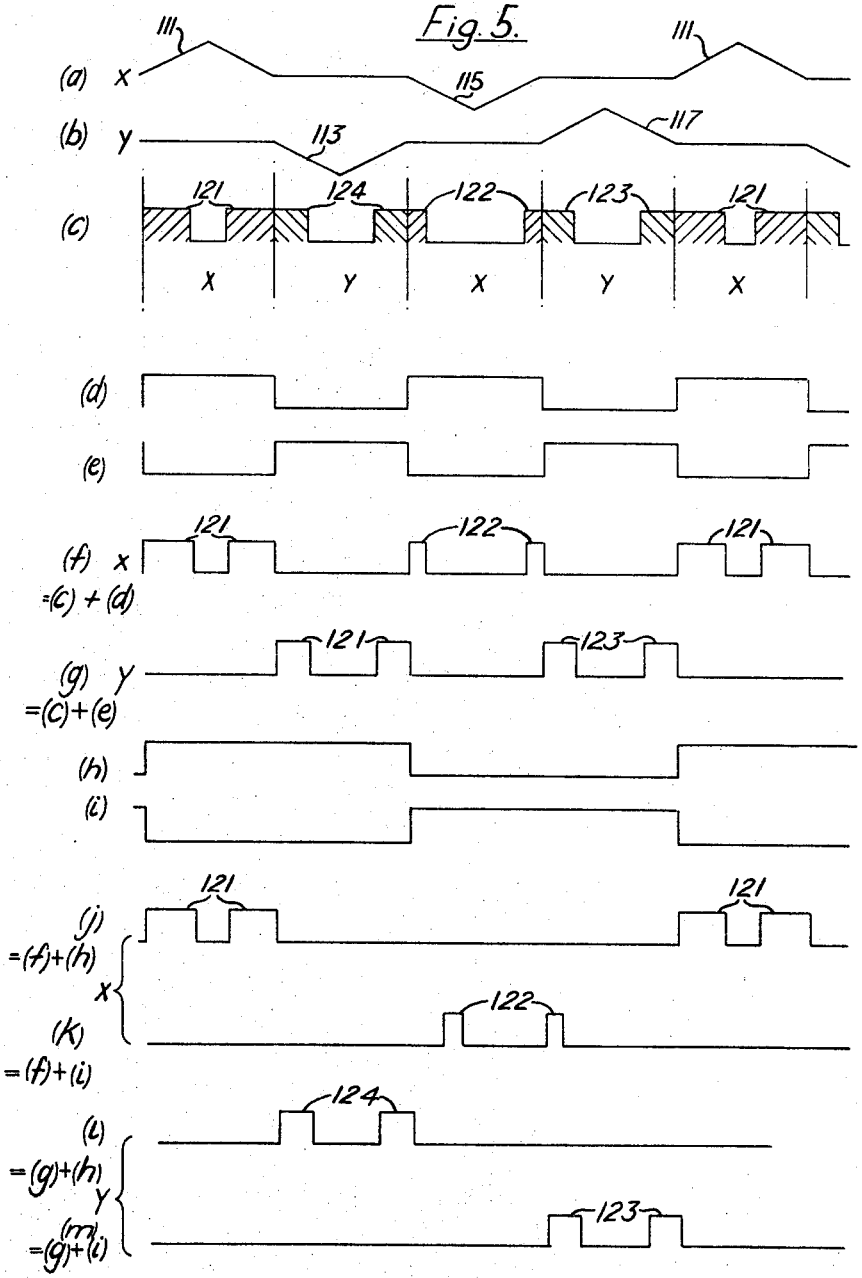

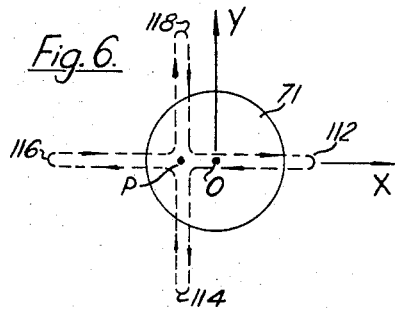
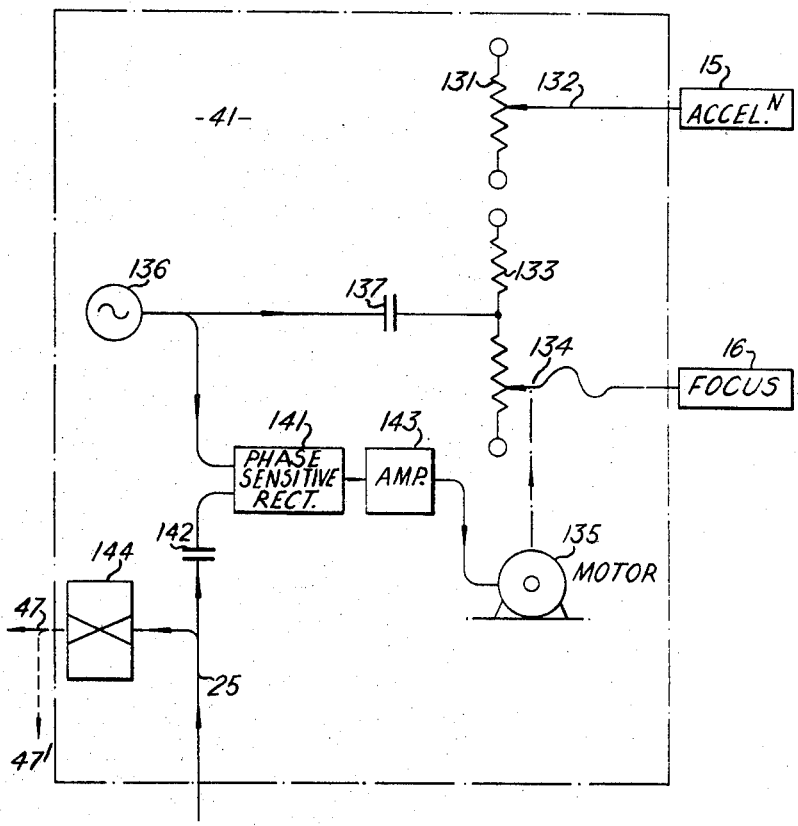

3,471,703
PHOTOELECTRIC CONTROL MEANS FOR THE DEFLECTION OF THE ELECTRON BEAM IN WELDING APPARATUS
Wilfred Neville Clark, Joppa, Edinburgh, Charles Irvine Conner, Penicuik, and Harry Ogden, Edinburgh, Scotland, assignors to Ferranti Limited, Hollinwood, Lancashire, England, a company of Great Britain and Northern Ireland
Continuation-in-part of application Ser. No. 573,357, Aug. 18, 1966. This application Aug. 15, 1968, Ser. No. 756,725
Claims priority, application Great Britain, Aug. 28, 1965, 37,102/65
Int. Cl. H01j 39/12, 3/14, 5/16
U.S. Cl. 250—234     11 Claims

ABSTRACT OF THE DISCLOSURE

A servo system to control the movement of, or maintain undeflected by stray fields, an electron beam in machining engagement with a workpiece, the system responding in dependence on the displacement with respect to a reference point on a photocell surface of a projected image of the light spot set up at the point where the beam engages the workpiece.

---

Figure 1:
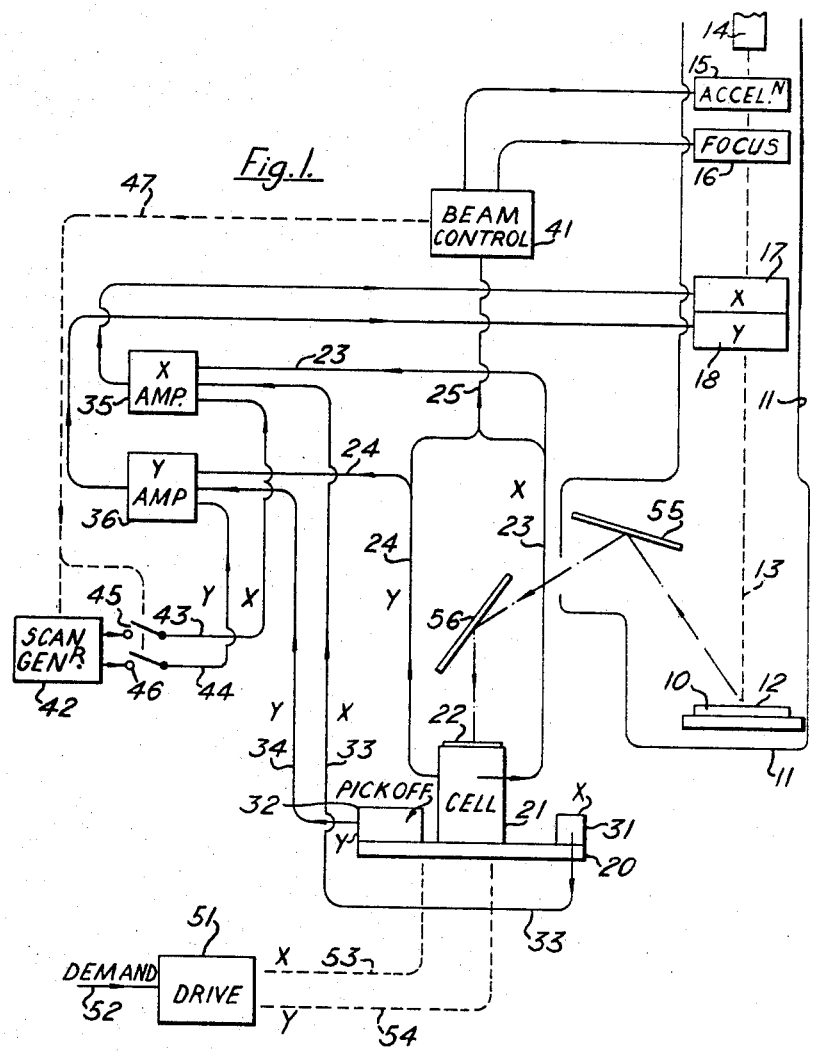

This is a continuation-in-part of application Ser. No. 573,357, filed Aug. 18, 1966.

This invention relates to systems for controlling beamed energy as applied to the surface of a workpiece.

The beam may be an electron beam; in which case the system may be applied to electron-beam welding apparatus, or to apparatus in which a workpiece is machined by the beam in some way—for example by removal of material by vaporisation. Or the beam may be ion beam or a laser beam.

An object of the invention is to provide such a system in which the beam either is deflected so as to direct its point of application to a desired spot on a workpiece surface, in particular in accordance with the requirements of a demand signal, or is maintained stationary.

Another object is to provide such a system in which the control is applied to the focus and/or acceleration of the beam so as to bring to a maximum the energy dissipated at the workpiece surface.

In accordance with the present invention, a system for controlling beamed energy as applied to a surface of a workpiece includes means for deflecting the beam in orthogonal directions, a photoelectric transducer for providing error signals in dependence on the displacement of a light spot in orthogonal directions with respect to a reference point on the sensitive surface of the transducer, an optical system for projecting onto that surface an image of the light spot where the beam engages the surface of the workpiece, a closed feedback loop including the transducer and the deflection means for deflecting the beam in dependence on said error signals so as to tend to null them and so maintain the spot image in approximate engagement with said reference point, movable control means for controlling in orthogonal directions the position of the beam spot on the workpiece, pick-offs for providing response signals in dependence on the movement of the control means, connections from the pick-offs to the deflection means to cause the beam to be deflected in dependence on the pick-off responses so as to tend to maintain the spot image within the sensitive surface of the transducer, and a driving stage for adjusting the control means, and hence the position of the beam spot on the workpiece, in dependence on a demand signal.

Also in accordance with the invention, a system for controlling a beam of energy as applied to a surface of a workpiece includes means for moving the workpiece with respect to a reference structure whilst the workpiece is engaged by the beam, deflection means for deflecting the beam in orthogonal directions with respect to the reference structure, a photoelectric transducer fixed with respect to the reference structure for providing error signals in dependence on the displacement of a light spot in orthogonal directions with respect to a reference point on the sensitive surface of the transducer, an optical system for projecting onto that sensitive surface an image of the light spot developed where the beam engages the surface of the workpiece, and a closed feedback loop including the transducer and the deflection means for deflecting the beam in dependence on said error signals so as to tend to null them and so maintain the spot image in approximate engagement with said reference point, thereby tending to maintain the beam substantially undeflected with respect to the reference structure despite such movement of the workpiece.

Figure 2:
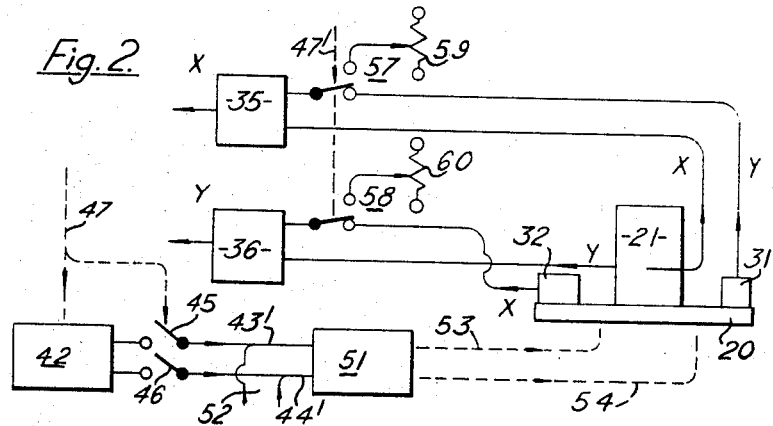
Figure 4:
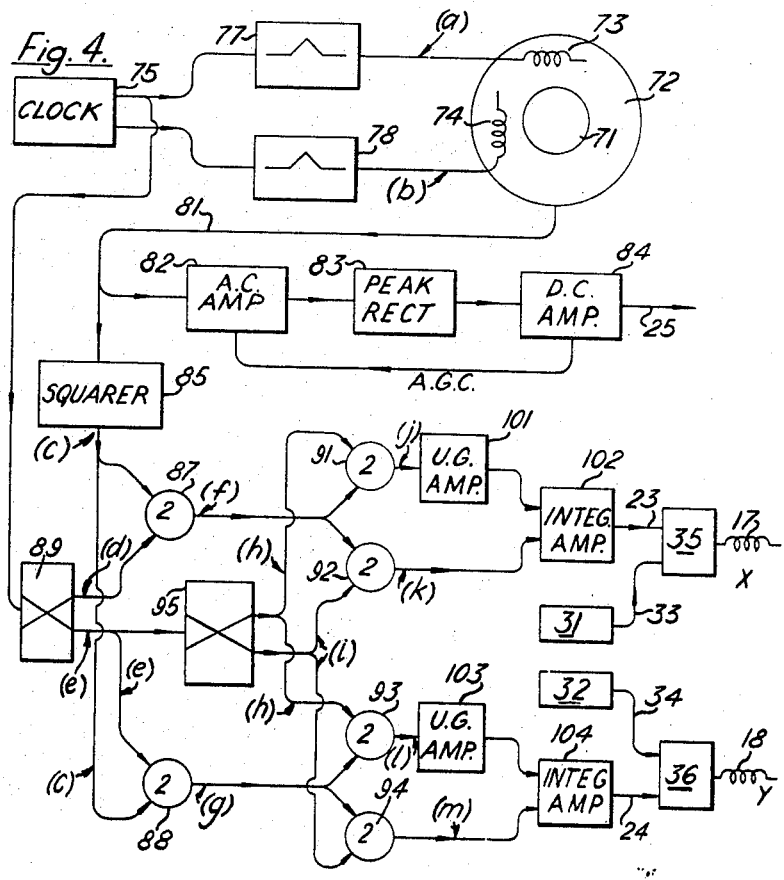
Figure 8:
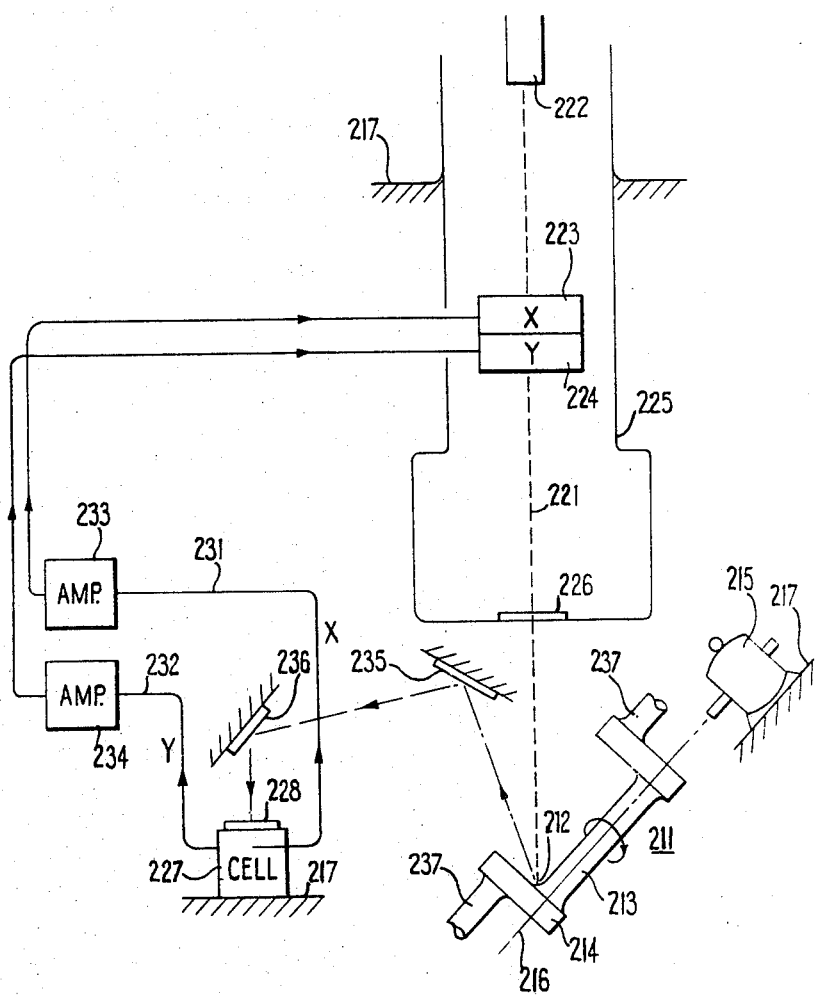

In the accompanying drawings,

FIGURES 1 and 3 show simplified schematic diagrams of two embodiments of the invention, FIGURE 2 shows a part of the arrangement of FIGURE 1 modified in accordance with a further embodiment, FIGURES 4 and 7 show suitable details for parts shown generally in each of FIGURES 1 and 3, FIGURES 5 and 6 are to illustrate the operation of the embodiment of FIGURE 4, FIGURE 8 is a simplified schematic diagram of another embodiment.

An embodiment of the invention will now be described by way of example as applied to electron-beam welding equipment. In this embodiment—see FIG. 1—the workpiece 10 is contained in an evacuated enclosure 11. The workpiece surface 12 which is to be engaged by the beam is assumed for convenience to be planar and is depicted as normal to the plane of the paper. The electron beam 13 is directed to surface 12 from a gun 14 by way of accelerating electrodes 15, focusing electrode 16, and means for deflecting the beam in the form of deflectors 17 and 18 for controlling the beam in the usual X and Y orthogonal directions. All these components are within the enclosure 11.

Outside the enclosure is movable control means in the form of a control carriage 20 mounted for movements in X and Y directions, parallel to those of the beam deflection, in planes which for convenience will be assumed as parallel to surface 12 of the workpiece. These movements of the carriage are with respect to some reference point (not shown) which is fixed with repsect to enclosure 11.

Mounted on the carriage is a photo-electric transducer 21 having a light sensitive surface 22 which is parallel to the planes of movement of the carriage. The transducer is such that when its sensitive surface 22 is engaged by a spot of light, outputs are supplied over X and Y leads 23 and 24 in dependence the coordinate position of the spot with respect to a reference point on surface 22 which will be assumed to be its centre. The directions of these X and Y coordinates will be considered as parallel to those of the carriage movement, though this is not essential. Suitable apparatus for this transducer is described below with reference to FIGS. 4 to 6. For convenience it will in the meantime be referred to as a photocell or cell, though in practice, as described below, it may include not only a photocell but considerable equipment in addition.

Associated with the carriage are X and Y linear pickoffs 31 and 32 in the form of potentiometers which provide over leads 33 and 34 direct-current signals which represent the X and Y coordinates of the position of the carriage with reference to the fixed reference point, first mentioned.

The outputs over X leads 23 and 33 are applied by way of a high-gain amplifier 35 to the X deflectors 17; similarly the outputs over Y leads 24 and 34 are applied by way of another high-gain amplifier 36 to the Y deflectors 18.

Cell 21 also supplies over a lead 25 a third output in the form of a potential or current which varies directly with the intensity of any light spot which engages surface 22. This output is applied to control a stage 41, which in turn supplies signals to the focus and acceleration electrodes 15 and 16.

To assist pickoffs 31 and 32 where necessary with the deflection of the beam, a scan generator 42 is provided to supply scanning signals in the X and Y directions over leads 43 and 44 as further inputs to amplifiers 35 and 36; these connections are by way of switches 45 and 46, the control of which, together with the control of the activation of the generator, is exercised by some sort of bistable device, forming part of stage 41, over a channel 47. Suitable apparatus for stage 41 is described below with reference to FIG. 7.

The position of carriage 20 is controlled by a driving stage 51, in response to demand signals received over a channel 52, by way of driving links 53 and 54 for moving the carriage in its X and Y directions.

By means of an optical projection system, represented in the drawing by mirrors 55 and 56, the necessary lenses being omitted for clarity, an image of surface 12 is projected onto the carriage so that the image of the light spot developed when the surface is engaged by the beam is brought to a conjugate position in the plane of sensitive surface 22 of the cell.

In operation, the workpiece is placed in enclosure 11, which is sufficiently demountable to allow this, and after the enclosure has been evacuated the beam is switched on.

The general arrangement is such that, ideally, whereever the carriage happens to be in its system of coordinates when the beam is switched on, the X and Y outputs from the pickoffs, acting by way of amplifiers 35 and 36 and the deflectors 17 and 18, so direct the beam that the image of the spot where the beam engages surface 12 falls within surface 22 of the cell. In response, the cell develops X and Y error signals in dependence on the displacement of the spot image from the reference centre of the surface, and, by applying those signals over leads 23 and 24 and the amplifiers to the deflection system, deflects the beam and hence the spot position in directions which tend to null the signals, thereby bringing the spot image into approximate registration with the centre of surface 22. A closed feedback servo loop is thus formed by the beam spot on the workpiece, the spot image, cell 21, the connections from the cell to the deflection system, and the beam itself. As usual with servo systems, the error signals are not completely nulled, but retain just sufficient values to maintain the required deflection of the beam; but provided that amplifiers 35 and 36 have high enough gains, the spot image will be centred on surface 22 to a very close approximation.

In this servo system, the carriage represents the input member, and the point of application of the beam on the workpiece represents the output member. Thus by moving the carriage, the position of the beam spot on the workpiece may be varied as desired; the follow-up is rapid enough to keep the spot image on the sensitive surface 22. By supplying stage 51 over channel 52 with a demand signal in which a programme of required spot position is enclosed, the carriage is driven by the driving links 53 and 54 and so causes the beam spot to engage the workpiece in accordance with the programme.

In practice, owing mainly to unavoidable non-linearities of the beam-deflection system, the condition may arise that when the beam is switched on, the signals from the pickoffs 31 and 32 do not bring the spot image onto surface 22, with the result that the servo loop cannot function. In this event the output from the cell 21 is zero, or at least a predictable minimum, and stage 41 is arranged to respond to such a signal by activating generator 42, by way of the bistable stages and channel 47, and closing switches 45 and 46 to cause its scan signals to be applied to the beam. As a result, the beam is scanned over the workpiece surface 12 until the spot image at length engages surface 22 of the cell. As the initial misalignment of the beam will usually be slight, for pickoffs 31 and 32 will usually have located the spot image fairly near surface 22, the duration of this superimposed scan is likely to be short. Once the spot image has been brought onto surface 22, the servo operates quickly to centre it. The resulting substantial output from the cell over lead 25 causes stage 41 to open switches 45 and 46 and render generator 42 inactive. Thereafter the servo operates to maintain the spot image approximately centred throughout the movements of the carriage in accordance with the programme.

In an alternative arrangement, see FIG. 2, generator 42 brings the spot image onto surface 22 by adjusting the position of carriage 20 in the X and Y directions, rather than by shifting the beam. The output from the generator, again by way of switches 45 and 46, is this time applied over leads $43^1$ and $44^1$, not to amplifiers 35 and 36, but as an input to driving stage 51 which is alternative to that provided over the demand channel 52. The generator and switches 45 and 46 are again controlled by stage 41 over channel 47.

When misalignment occurs, the resulting minimal output from cell 21 brings stage 41 into action as before to energise generator 42 and close switches 45 and 46. In the present arrangement, the generator output is applied by way of stage 51 to drive the carriage 20, thereby causing the spot image to scane the carriage until brought onto surface 22. As the actual beam spot must be immobolised on the workpiece during this scan, it is necessary to disconnect from the deflectors 17 and 18 the two pickoffs 31 and 32, since their outputs will be varying with the movement of the carriage. To effect this, changeover switches 57 and 58 are inserted in the leads from the pickoffs to the amplifiers 35 and 36.

In their Make condition, these switches connect the amplifiers to the pickoffs, whereas when operated to their Break condition they connect the amplifiers instead to two sources of potential, in the form of potentiometers 59 and 60, which are manually adjustable to retain the beam in an appropriate position. The switches are normally in their Make condition, but are operated to Break, or interrupt, the connections from the pickoffs to the deflection means by stage 41, acting over an auxiliary channel $47^1$, at the same time as the stage closes switches 45 and 46 and energises the scan generator 42. At the end of the scan, stage 41 operates the switches 57 and 58 to reconnect the pickoffs to the amplifiers.

Beam-control stage 41 also serves to control such an energy characteristic of the beam as the focus or acceleration of the beam, in dependence on the strength of the signal received from the cell over lead 25, so as to bring to a maximum the energy dissapated at the beam spot on the workpiece. This part of the operation relies on the fact that the brightness of the spot on the workpiece, and sence of its image on surface 22, are directly related to the energy being dissipated, and the strength of the output signal from the cell is directly related to the brightness of the spot image. As will be more fully described with reference to FIG. 7, stage 41 operates to adjust the focus and the acceleration of the beam to bring to a maximum the signal it receives from the cell, and hence the energy dissipated.

Another modified form of the arrangement of FIG. 1, but with the scan generator exercising its control by driving the control means as in the arrangement in FIG. 2, is shown in FIG. 3, in which the components already described are given their previous reference numbers.

The present arrangement differs from that of FIG. 1 in that the carriage is absent, the cell 21 is fixed, and the movable control means takes the form of an optical device, such as a mirror, which forms part of the optical system and is mounted for angular movements about or thogonal axes so as to bring the spot image onto the sensitive surface of the cell. The pickoffs are now of the angular kind, responsive to those movements.

As before, the workpiece 10 is contained in an evacuated enclosure 11 in which the workpiece surface 12 is engaged by an electron beam 13 from a gun 14 by way of accelerating electrodes 15, focusing electrodes 16, and deflecting means 17 and 18.

This time as already mentioned, the photo-electric transducer of cell 21 is not mounted for movement on a carriage but is fixed with respect to the enclosure 11, and the movement of the spot image to bring it into engagement with the sensitive plane surface 22 of the cell is effected by suitable movement of a mirror 61 forming part of the optical path between the surface 12 of the workpiece and surface 22 of the cell.

For this purpose mirror 61, which is outside the enclosure 11, is mounted on a gimbal system 62 to allow its angular movements about orthogonal axes A and B. The angular positions of the mirror about these axes with respect to fixed datum directions are measured by angular pickoffs 63 and 64; these pickoffs wil be referred to hereinafter as the X and the Y pickoffs, respectively, since the angular movements of the mirror about its A and B axes cause movements of the spot image in the X and Y directions in the plane containing the sensitive surface 22. The outputs from these pickoffs, which correspond to pickoffs 31 and 32 of the earlier system, are applied to beam-deflectors 17 and 18 by way of amplifiers 35 and 36. The connections from the pickoffs to the amplifiers are by way of Break switches 65 and 66, respectively, which are controlled by stage 41 over an extension 47[1] of channel 47.

The X and Y outputs from cell 21 to the amplifiers over leads 23 and 24 and to stage 41 over lead 25, and the control connections from stage 41 to electrodes 15 and 16, are the same as before.

The angular positions of the mirror about the A and B axes are controlled by driving stage 51 over A and B links 53 and 54. The arrangement is such that the angular movements of the mirror scan with the spot image the plane containing the sensitive area 22 of the cell.

The output from scan generator 42, again by way of Make switches 45 and 46, is applied as in FIG. 1 over leads 43[1] and 44[1] as an input to driving stage 51 which is alternative to the input provided over the demand channel 52. The generator and switches 45 and 46 are again controlled by stage 41 over channel 47.

Under normal conditions of operation, switches 65 and 66 are closed, switches 45 and 46 are open, and generator 42 inoperative. Mirror 61 functions similarly to carriage 20 of the earlier system.

Ideally, therefore, wherever the mirror happens to be about its angular axes when the beam is switched on, the X and Y outputs from its pickoffs 63 and 64, acting by way of the closed switches 65 and 66, amplifiers 35 and 36, and deflectors 17 and 18, cause the beam to be so directed that the image of the spot where the beam engages surface 12 of the workpiece falls within surface 22 of the cell.

In response, the closed feadback servo loop constituted by the beam spot on the workpiece, the spot image, cell 21, the connections from it to the deflectors, and the beam itself, operates as before to hold the spot image as close to the reference centre of surface 22 as the necessity for developing an error signal allows. And by supplying stage 51 over channel 52 with a demand signal the mirror is adjusted in its angular positions to cause the beam spot to engage the workpiece in accordance with the desired programme. It is desirable for the mirror to be located sufficiently far from the workpiece for the required movements of the spot in X and Y directions in the plane of surface 22 are proportional to the corresponding angular movements of the mirror about the A and B axes.

When misalignment occurs, so that when the beam is first switched on the signals from the pickoffs do not bring the spot image onto surface 22, the resulting zero or minimal output from cell 21 brings stage 41 into action as before to energise generator 42 and close switches 45 and 46. The generator output is applied to stage 51, as an alternative to the input to that stage from the demand channel, and therefore causes the mirror to scan with the spot image the plane containing sensitive area 22 until the spot image engages that area, thereby reversing the action of stage 41 and allowing the servo to take over the control to centre the spot as already described. Over extension 47[1] stage 41 opens switches 65 and 66 to disconnect the pickoffs from the deflectors whilst this scanning is taking place. If desired, these switches may be of the changeover kind, as are switches 57 and 58 in FIG. 2, to replace the pickoff inputs to the amplifiers by potentials derived from adjustable sources.

Stage 41 also acts as before to control the acceleration electrodes 15 and focusing electrodes 16 to bring to a maximum the energy dissipated at the beam spot on the workpiece.

The control means may be an optical device, such as a prism or combination of prisms, rather than a mirror as described above.

A simple arrangement for transducer 21, not shown, includes a square pyramid reflector arranged to split up the spot image four ways to four photocells so that the differential output from two opposite cells indicates the displacement of the beam in one direction whilst the differential output from the other two indicates the displacement in the direction at right angles. The summed output from all four cells forms the total output to be applied to stage 41 over lead 25. A more complicated but preferred arrangement which uses one cell with some extensive associated circuitry for use with the arrangement of FIG. 1 will now be described with reference to FIGS. 4 to 6.

The photocell is assumed to be of the known kind in which the spot image first falls on a photocathode the electrons from which are focused as an electron image in an image plane within the cell. This plane has a circular aperture through which the electrons can pass to a dynode stage followed by an output anode. Across this aperture the electron image of the spot can be swept in X and Y directions by interior deflector coils. To simplify the description, all that is shown of the cell in FIG. 4 is the aperture 71 inside the cell 72 with the interior X and Y deflector coils 73 and 74. Aperture 71 is the equivalent of the sensitive surface, above mentioned, of the cell, and the coils may be thought of as capable of sweeping the spot image across it in a manner to be described.

From the counterphase outputs of a clock pulse generator in the form of a multivibrator 75, X and Y triangular deflection signals are derived in sawtooth generator stages 77 and 78 for application to coils 73 and 74 respectively.

The cell output is applied over a lead 81 to an alternating current amplifier 82, a peak rectifier 83, and a direct-current amplifier 84, to provide over output lead 25 (see FIG. 1) the signal which varies in intensity with the intensity of the spot image. An auto gain control is fed back from stage 84 to stage 82.

The cell output, after amplification, limiting, and squaring in a stage 85, is also applied as an input to each of And gates 87 and 88 and other inputs to which are provided by the respective counterphase outputs from a bistable stage 89 driven by clock 75.

The output from gate 87 is applied as an input to each of two further And gates 91 and 92, whilst the output from gate 88 is applied as an input to each of And gates 93 and 94. The remaining inputs to gates 91 and 93 are supplied by one of the outputs from a bistable stage 95 driven by one of the outputs from stage 89; the other output from stage 95 is applied to gates 92 and 94.

The output from gate 91, after being reversed in polarity by a unity-gain amplifier 101, is applied by way of an integrating amplifier 102 and linear amplifier 35 (FIG. 1) to the X deflector coils 17 of the main beam. The output from gate 92 is applied direct as a second input to amplifier 102. A second input amplifier 35 is derived from the X pickoff 31 (FIG. 1).

Similar arrangements are made for the Y deflector coils. Gate 93 is connected by way of a reversing amplifier 103 to an integrating amplifier 104, the other input to which is derived from gate 94 without reversal. The output from amplifier 104 is applied with the signal from the Y pickoff 32 to the Y coils 18 by way of linear amplifier 36.

The operation of this equipment will be described with reference to the signal waveforms of FIG. 5. All these waveforms are of the triangular or rectangular kind including portions which would be conventionally designated positive-going or negative-going. For ease of description, however, these portions will be referred to simply as positive or negative, as if the zero signal line transected each waveform. It will however be appreciated that the zero level may in fact be wholly above or wholly below the wave, with the result that both portions are negative or both positive, as the case may be.

The waveforms of the X and Y triangular deflection signals applied by stages 77 and 78 to deflect the spot image are shown at (a) and (b). Their effect on the spot's position with respect to the X and Y coordinates having as origin O the centre of the aperture 71 of the photocell is shown in FIG. 6. It is assumed that the mean position P of the spot, as determined by the outputs from pickoffs 31 and 32 (FIG. 1) lies on the X axis but somewhat displaced in the negative direction from the Y axis. The to-and-fro movements of the spot as the result of the application of the triangular swings of waves (a) and (b) to coils 73 and 74 of the cell (see FIG. 4) are shown in broken lines with the outputs and return paths slightly displaced from one another for clarity.

Thus the positive X swing 111 of signal (a) carries the spot image from the point P in the positive direction along the X axis to the point 112 outside aperture 71 and then back to the point P. The next excursion of the spot is negatively in the Y direction in response to the Y swing 113 of signal (b), carrying the spot to point 114 outside operture 71 and then back. Similarly the negative X swing 115 carries the spot to point 116 and back, and is followed by the positive Y swing 117 to point 118 and back. The cycle is then repeated.

Wave (c) shows the effect of these excursions on the output from the cell after limiting and squaring by stage 85. So long as the spot image is within aperture 71 the cell delivers a steady output signal, which falls to zero (or some known constant minimum) as soon as the spot passes outside the aperture on its way to some of points 112, 114, 116, or 118. In drawing the waveform it has been assumed for convenience that the spot image is of negligible area, giving an abrupt transition between the two states.

Thus as shown by wave (c) the result of each excursion is a pair of pulses of equal width representing the outgoing and return movements of the spot across aperture 71 separated by a space representing the intermediate period whilst the pulse is outside and in consequence the cell output in minimal. Because of the displacement of the point P from the centre O of the aperture, the spot remains longer within aperture 71 during the positive X excursions than during the excursions in the opposite direction. Hence each X pulse of pulse pairs 121 of signal (c) due to positive swings 111 of signal (a) is considerably wider than each X pulse 122 due to the negative swings 115.

On the other hand as the point P is on the X axis, the Y pulses 123 due to positive Y swings 116 of signal (b) have the same width as pulses 124 due to the opposite swings 113.

All that the rest of the equipment of FIG. 4 does is to derive for each of the X and Y directions an error signal which is in sense and quantitative dependence on the difference between the widths of pulses 121 and 122 for the X axis, and pulses 123 and 124 for the Y axis, and apply those error signals to bring the spot image to the centre O of aperture 71. In the present instance the fact that the Y pulses 123 and 124 are of equal width shows that the spot is already correctly positioned as regards the Y axis; consequently an error signal is developed for only the X axis.

In more detail, stage 89 produces counterphase square-wave outputs (d) and (e) each positive half-cycle of which coincides with the X swings of wave (a) and the Y swings of wave (b) respectively. By combining signals (c) and (d) at gate 87, which responds to positive inputs, all the X pulses are divided out of signal (c), as shown at (f).

Similarly by combining signals (c) and (e) at gate 88 the Y pulses are divided out—see waveform (g).

It is now necessary to split up the pulses still further, dividing those resulting from the positive swings of the deflection signals from those resulting from the negative swings. For this purpose stage 95 develops from the signal (e) output of stage 89 counterphase rectangular signals of half the frequency—see waveforms (h) and (i). It will be seen that the positive half-cycles of signal (h) coincide with only the X pulses 121 which are due to the positive swings of the deflection signal, and only Y pulses 124 due to negative swings. The remaining X and Y pulses 122 and 123 coincide with the positive swings of signal (i).

Thus by combining signals (f) and (h) at gate 91 the X pulses 121 are derived, see wave (j), the other X pulses 122 being derived from signals (f) and (i) at gate 92—wave (k).

The Y signals are similarly separated by combining signal (g) with signals (h) and (i) at gates 93 and 94—see waveforms (l) and (m).

Having thus separated the two trains of X pulses 121 and 122, it is now necessary to provide an output dependent on their width difference. This is effected by the integrating amplifier 102 after the polarity of pulses 121 has been reversed by stage 101 to result in subtraction. The output from amplifier 102 is thus a D.C. error signal of sense and value determined by the pulse width difference, and so representing the extent and sense of the displacement of the mean position P of the spot image from the centre O of aperture 71 in the direction of the X axis. In amplifier 35 this error signal is combined with the signal from the X pickoff 31 to energise coils 17.

Similarly with the Y coordinate: stages 103 and 104 derive the Y error signal—in this instance zero—is dependence on the width difference between pulses 123 and 124, the signal from pickoff 32 being added at amplifier 36 before application to the Y coils 18.

The above-described form of cell 21 may also be used for the embodiment of FIG. 3, with the X and Y pickoffs (designated 63 and 64) now of the angular kind.

Beam-control stage 41 may take the form shown in FIG. 7. In this arrangement the accelerating voltage applied to electrode 15 is kept constant; it is accordingly derived from an energised D.C. potentiometer 131 by way of a slider 132 which is manually adjustable to provide the degree of acceleration required.

The focusing voltage for electrode 16 is derived from another energised D.C. potentiometer 133 by way of a slider 134 adjustable by a motor 135.

An oscillator 136 imposes cyclic variations on the focusing potential by way of a capacitor 137 and a central tap on potentiometer 133. The output from the oscillator is also applied to a phase-sensitive rectifier 141 to provide a signal of reference phase to compare with the A.C. component (due to the resulting cyclic variations of intensity of the spot image) of the A.C. signal from the photocell. The signal is received over lead 25, from which the A.C. component is extracted and applied to stage 141 by way of a capacitor 142.

The output from stage 141 is applied by way of an amplifier 143 to drive the motor 135.

Lead 25 is also connected to apply a triggering signal to a bistable stage 144 an output of which is applied to channels 47 and 47$^1$.

The operation relies on the fact that the brightness of the spot image is related to the focus potential by a curve which passes over a maximum (where the curve is nearly flat) at a point where the focus potential has an optimum value. Assuming again that the photocell is of the kind having an output which varies directly with the light intensity, a similar curve relates the value of the photocell signal to the focus potential.

Where the focus potential has the optimum value, the fluctuations imposed on it by oscillator 136 lie within the nearly flat part of the curve. As a result, no appreciable A.C. component is present in the signal from the photocell.

Where on the other hand the focus potential is appreciably different from optimum, the oscillations take place on a sloping part of the response curve. Accordingly an A.C. component appears in the signal from the cell and is in phase or in counterphase with the reference signal from the oscillator 136 according as the mean focus potential is less or greater than the optimum value. In response to this A.C. signal, stage 141 derives an output signal which (after amplification by stage 143) is applied to the motor 135 to cause it to adjust slider 134 in the sense to shift the focus potential towards optimum.

Stage 144 is triggered whenever the signal on lead 25 falls to a predetermined minimum level. When so triggered, the stage applied over channel 47 (and channel 47$^1$, where provided) the switching signals required to bring the scan generator into operation.

Driving links 53 and 54 of FIG. 1 may take the form of a closed-loop servo system in which the actual drive in each of the X and Y directions is applied by a reversible servo motor energised by an error signal; this signal is derived from a comparison of the demand signals from channel 52 with measurement signals which represent the actual positions of the carriage along those axes.

In certain applications it may be necessary merely to maintain the beam undeflected with respect to a reference structure whilst engaging the workpiece, despite the presence of fields or other influences which tend to deflect the beam. Such fields may for example be due to the fact that the workpiece was held in a magnetic vice or chuck during a preceding operation. The reference structure would include the equipment which generates the beam and the framework of the machine tool or other apparatus which supports the workpiece.

Thus where the workpiece is rotating with respect to the tool framework whilst engaged by the beam—for example, so as to cause the beam to traverse a circular path on or around the workpiece—the movement of the parts of the workpiece not so engaged may tend to cause such deflection by the corresponding movement of electric or magnetic fields which they set up adjacent to the beam. The beam accordingly becomes deflected from the desired path on the workpiece, and a defective operation results.

A suitable arrangement for this purpose in accordance with the invention will now be described with reference to FIG. 8.

The workpiece 211 is assumed to be a crankshaft. The surface to be engaged by the beam is the joint 212 between the crank pin 213 and one of the webs 214, which are to be welded together. To enable the beam to traverse the full circle of the joint, means (represented by a motor 215) are provided for rotating the workpiece about the axis 216 of the crank pin whilst engaged by the beam. This rotation is with respect to a reference structure, such as a supporting framework, of the equipment; such parts of this structure as require to be depicted in the drawing are all given the reference 217. As will readily be appreciated, it is usually easier to weld such a circular joint by rotating the workpiece rather than the beam-generating and control equipment.

The electron beam 221 is directed towards the workpiece from a gun 222 by way of deflection means in the form of deflecting electrodes or deflectors 223 and 224 for displacing the beam in the usual X and Y orthogonal directions. These components are within an evacuated enclosure 225 having an electron-permeable window 226 (of, say, aluminum foil) through which the beam passes to the workpiece, which for convenience of manipulation is outside the enclosure.

Also outside the enclosure and fixed to the reference structure 217 is a photoelectric transducer 227 having a light-sensitive surface 228. The transducer is such that when its sensitive surface is engaged by a spot of light, outputs are supplied over X and Y leads 231 and 232 in dependence on the X and Y coordinate position of the spot with respect to a reference point on surface 228 which will be assumed to be it centre. This coordinate system is conveniently in parallel to that of the X and Y deflectors 223 and 224, though that is not essential. Transducer 227 will hereinafter be referred to for convenience as a photocell or cell.

The outputs from the cell over leads 231 and 232 are applied by way of high-gain amplifiers 233 and 234 to the X and Y deflectors 223 and 224.

By means of an optical deflection system, represented in the drawing by mirrors 235 and 236, fixed to the reference structure, the necessary lenses being omitted for clarity, an image of the light spot developed where the beam engages the workpiece is projected onto the sensitive surface 28 of the cell.

In operation, the apparatus is initially adjusted so that, with the workpiece as yet stationary, the beam engages a point on the joint 212; the image of the resulting light spot at that point is projected onto surface 228 of the cell so as to coincide with its central point of reference; and the respective X and Y outputs from the cell are such as to energise deflectors 223 and 224 to the extents appropriate to maintaining the beam in that position. The motor 215 is then energized to start rotating the workpiece about the crank pin axis 216.

From a glance at the drawing, it will readily be appreciated that as such rotation continues, the webs 214 and attached parts 237 of the main shaft will vary cyclically in their distance from the beam, thereby tending to deflect it by the electric or magnetic fields which they set up. Any tendency of the beam to respond to such influence displaces the spot from joint 212 and hence the spot image from the centre of photocell surface 228. In response, the cell supplies X and/or Y signals over leads 231 and 232 to the X and Y deflectors 223 and 224 such as to overcome this extraneous deflecting force and keep the beam approximately in the correct position—engaging joint 212—and so nulling the error signals.

A closed feedback loop is thus formed by the beam spot on the workpiece, the spot image on surface 228, cell 227, the connection from it to the deflectors, and the beam itself. As usual with servo systems, the error signals set up by the photocell are not completely nulled, but retain just sufficient values to maintain the required deflection of the beam; but provided that amplifiers 233 and 234 have high enough gains, the spot image will be centered on surface 228, and the beam aligned with joint 212, to a very close approximation.

Photocell 227 may take a form similar to that of cell 21 of FIG. 1, the details of which are described above with reference to FIGS. 4 to 6.

Photocell 227 may also be used to control the focus and acceleration of the beam as described with reference to FIGURES 1 and 7.

What we claim is:

1. A system for controlling beamed energy as applied to the surface of a workpiece including
    (a) deflection means for deflecting the beam in orthogonal directions,
    (b) a photoelectric transducer for providing error signals in dependence on the displacement of a light spot in orthogonal directions with respect to a reference point on the sensitive surface of the transducer,
    (c) an optical system for projection onto that surface an image of the light spot where the beam engages the surface of the workpiece, and
    (d) a closed feedback loop including the transducer and the deflection means for deflecting the beam in dependence on said error signals so as to tend to null them and so maitnain the spot image in approximate engagement with said reference point.

2. A system for controlling beamed energy as applied to the surface of a workpiece including means for deflecting the beam in orthogonal directions, a photoelectric transducer for providing error signals in dependence on the displacement of a light spot in orthogonal directions with respect to a reference point on the sensitive surface of the transducer, an optical system for projecting onto that surface an image of the light spot where the beam engages the surface of the workpiece, a closed feedback loop including the transducer and the deflecting means for deflecting the beam in dependence on said error signals so as to tend to null them and so maintain the spot image in approximate engagement with said reference point, movable control means for controlling in orthogonal directions the position of the beam spot on the workpiece, pick-offs for providing response signals in dependence on the movement of the control means, connections from the pick-offs to the deflection means to cause the beam to be deflected in dependence on the pick-off responses so as to tend to maintain the spot image within the sensitive surface of the transducer, and a driving stage for adjusting the control means, and hence the position of the beam spot on the workpiece, in dependence on a demand signal.

3. A system as claimed in claim 2 which further includes a scan generator, connections from the transducer to the generator to cause the generator to be actuated when the output from the transducer has fallen as the result of a departure of the spot image from the sensitive surface of the transducer, and scanning means whereby the generator when so actuated effects a scanning operation to restore the spot image to that surface.

4. A system as claimed in claim 3 wherein the scanning means includes connections from the generator to said means for deflecting the beam to allow the generator when actuated to superimpose beam deflection signals on those of the pickoffs to assist the pickoffs with the deflection of the beam.

5. A system as claimed in claim 3 wherein the scanning means includes connections from the generator to said control means to allow the generator when actuated to adjust the control means, there being provided switching means in the connections from the pickoffs to said means for deflecting the beam and connections from the transducer to the switching means so as to interrupt those connections throughout the scanning operation.

6. A system as claimed in claim 2 wherein the control means includes a carriage mounted for movements in orthogonal directions and connections from the driving stage to the carriage to cause the demand signal to control those movements, said pickoffs being responsive to those movements, and the transducer being mounted on the carriage.

7. A system as claimed in claim 2 where the transducer is of the kind having an output that varies with the intensity of the light which engages the transducer and the system includes at least one electrode for controlling an energy characteristic of the beam, such as its focus or acceleration, wherein the system also includes a beam-control stage, connections from the stage to said electrode, and connections from the transducer to the beam-control stage, that stage being such as to energise said electrode in dependence on the transducer output to bring to a maximum the energy dissipated at the surface of the workpiece.

8. A system as claimed in claim 7 wherein the beam-control stage includes a generator of cyclic signals, a connection from the generator to said electrode to impose cyclic variations on said characteristics, means for adjusting the mean value of that characteristic, a phase-sensitive stage, input connections to that stage from said generator and from the transducer, the stage being arranged to provide an output in sense dependence on the relative phase of the input signals, and output connections from the phase-sensitive stage to said means for adjusting the mean value of said characteristic.

9. A system as claimed in claim 2 wherein the transducer includes a photocell having said sensitive surface, deflection stages for imparting to the light spot sequential excursions along said orthognal directions from the mean position of the spot on said sensitive surface, at least one such excursion in each direction being sufficient to carry the spot outside the sensitive surface, a gating network, connections from the photocell to the network, the network including stages for separating into one or other of two output channels the photocell output signals resulting from the excursions of the spot along one or other of said orthogonal directions respectively, for each orthogonal direction further stages for deriving in respect of that direction a said error signal in sense and quantitative dependence on the difference between the widths of the signals resulting from excursions on one and of the other sense of the spot from its mean position, and connections from each of said output channels to the corresponding one of said further stages.

10. A system for controlling a beam of energy as applied to the surface of a workpiece including
    (a) means for moving the workpiece with respect to a reference structure whilst the workpiece is engaged by the beam,
    (b) deflection means for deflecting the beam in orthogonal directions with respect to the reference structure,
    (c) a photoelectric transducer fixed with respect to the reference structure for providing error signals in dependence on the displacement of a light spot in orthogonal directions with respect to a reference point on the sensitive surface of the transducer,
    (d) an optical system for projecting onto that sensitive surface an image of the light spot developed where the beam engages the surface of the workpiece, and
    (e) a closed feedback loop including the transducer and the deflection means for deflecting the beam in dependence on said error signals so as to tend to null them and so maintain the spot image in approximate engagement with the said reference point, thereby tending to maintain the beam substantially undeflected with respect to the reference structure despite such movement of the workpiece.

11. A system as claimed in claim 10 wherein the closed loop includes for each error signal a connection from the transducer to the deflection means by way of a high-gain amplifier.

References Cited

UNITED STATES PATENTS

| | | | |
|---|---|---|---|
| 3,146,335 | 8/1964 | Samuelson | 219—121 |
| 3,148,265 | 9/1964 | Hansen | 250—49.5 X |
| 3,152,238 | 10/1964 | Anderson | 219—121 |
| 3,283,120 | 11/1966 | Spruck | 219—121 |

JAMES W. LAWRENCE, Primary Examiner

V. LAFRANCHI, Assistant Examiner

U.S. Cl. X.R.

219—121; 250—49.5, 204; 315—26